Oct. 11, 1949.   F. BONCOMPAIN   2,484,069
AUTOMATIC CONTROL AGRICULTURAL MACHINE
Filed July 21, 1945
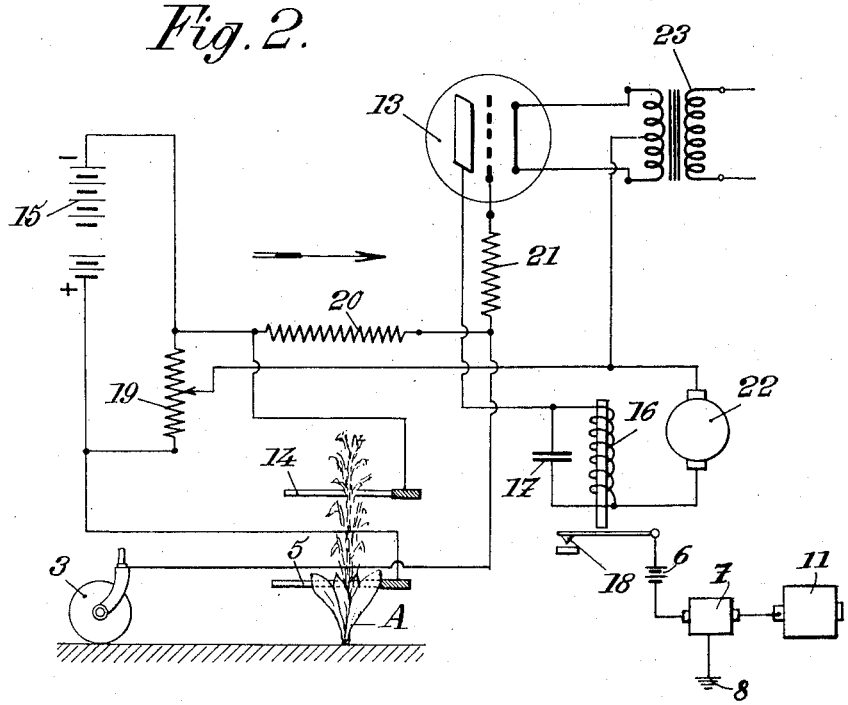
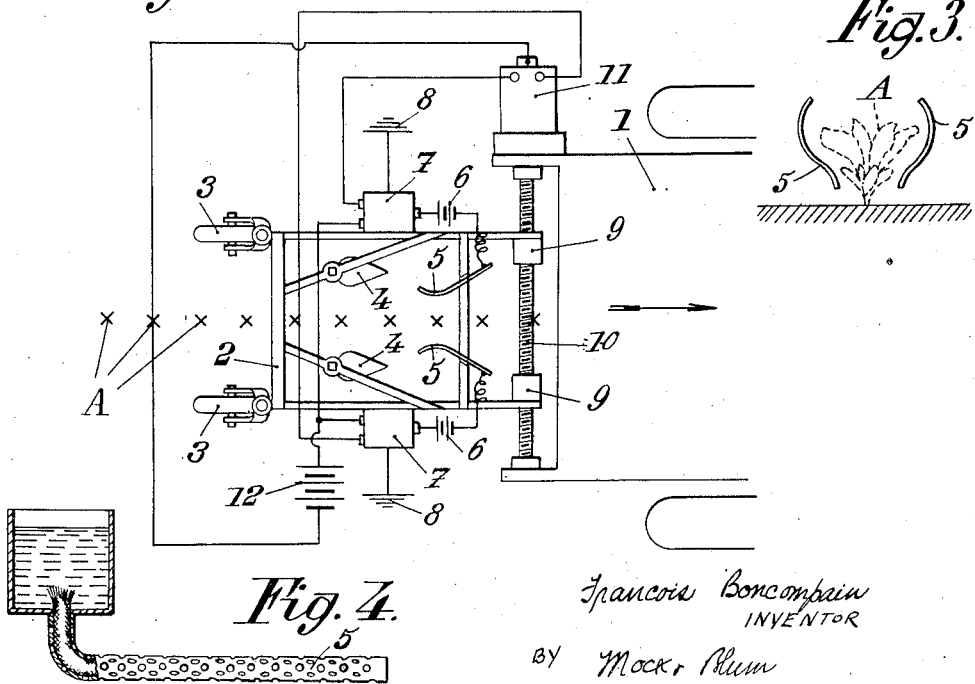
Francois Boncompain
INVENTOR
BY Mock & Blum
ATTORNEYS Patented Oct. 11, 1949

2,484,069

UNITED STATES PATENT OFFICE 2,484,069

AUTOMATIC CONTROL AGRICULTURAL MACHINE

François Boncompain, Saint-Ouen, France, assignor, by direct and mesne assignments, to Etablissements Labinal, Saint-Ouen, France, a society of France, and SEBMA S. A., Societe d'Exploitation de Brevets de Machines Agricoles, Romont, Switzerland, a Swiss company Application July 21, 1945, Serial No. 606,397
In France July 24, 1944

5 Claims. (Cl. 97—135)

The present invention relates to automatic control agricultural (this expression including also horiticultural) machines and more especially those used for the cultivation of linear plantations.

There exist machines of this kind adapted to have their working tools deflected or withdrawn when a contact element mounted ahead of the tool comes to touch one of the plants of the line that is being cultivated. In such machines, the contact element in question is displaced by the resistance of the plant that it has touched, and this displacement causes the tool to be deflected.

But these machines have the drawback that, in order to be left intact, a plant must be capable of resisting the thrust of the contact element to a sufficient degree. Otherwise (and this occurs frequently) the plant is destroyed.

The chief object of the present invention is to provide a machine of the type above referred to which avoids this drawback.

Other objects of the invention will result from the following detailed description of some specific embodiments thereof, with reference to the accompanying drawings, given merely by way of example, and in which:

Fig. 1 is a diagrammatical plan view of an automatic control agricultural machine made according to the invention;

Figs. 2 and 3 are diagrammatical views relating to modifications;

Fig. 4 is a separate view on a larger scale of an electric contact element or brush.

In the examples shown, it has been supposed that the machine in question is a weeding machine including a normal tractor.

According to the embodiment illustrated by Fig. 1, a frame 2, supported at the rear by pivotable wheels 3 and secured at the front to the tractor, is provided with the following elements:

a. On the one hand, two tools 4 adapted to plough earth along two lines sufficiently spaced apart from each other for leaving intact a strip of land of such a width that when the tools work on either side of a row of plants A, said plants are not destroyed by said tools; and, b. On the other hand, two brushes 5 disposed horizontally ahead of tools 4 and at a level (preferably adjustable) such that they can come into contact with plants A in their present state of growth;

These brushes are disposed in such manner that if the machine is supposed to be in position with its tools 4 on either side of the line of plants A to be cultivated, said brushes are also located on either side of said line.

Brushes 5 are preferably constituted by flexible metal blades fixed at the front, with the desired insulation, to frame 2, and converging toward the rear so that their rear ends are at a distance from each other at most equal to twice the maximum transverse distance that is admissible for the machine to be displaced on either side of its middle position without bringing the tools into contact with the row of plants.

Preferably, each brush 5 (Fig. 4) is constituted by a metallic perforated sheath containing a textile wick kept moist with a conducting salt solution so as to ensure a good electric contact with plants A.

Each of these brushes is connected with one of the terminals of a source of current 6 the other terminal of which is connected to the input end of the control circuit of a relay 7. The output end of this control circuit is grounded at 8, for instance by being connected to frame 2.

Finally, the controlled circuits of the two relays are connected to means for displacing frame 2 toward the left when the relay 7 connected to the left hand brush has been energized by said brush and for displacing frame 2 toward the right when the relay 7 connected to the right hand brush has been energized by it. Of course, the energizing of a relay 7 is caused by the fact that the control circuit thereof is closed through the earth and a plant that has come into contact with the corresponding brush 5.

Such means may, for instance, be constituted by a particular fixation of frame 2 to tractor 1. In the embodiment shown by the drawing, frame 2 is provided at the front with screw threaded sleeves 9 in mesh with a horizontal screw 10 carried in bearings fixed to the tractor. Screw 10 can be rotated in one direction or the other by an electric motor 11 when current from a source 12 is fed to said motor through one or the other of said relays 7.

Operation of this device results from the preceding explanations. It will be understood that, even if the tractor is not piloted with precision, tools 4 will leave the rows of plants A intact.

According to another feature of the invention, in order to destroy parasitical plants such as thistle, which grow more rapidly than cultivated plants, other contact means, located higher than brushes 5, are provided for preventing the tools from being deflected when said brushes 5 come into contact with such parasitical plants.

An embodiment of such a construction is illustrated by Fig. 2, in which the second contact means consist of brushes 14 analogous to brushes 5 but located at a higher level than them and a little ahead thereof.

Brushes 5 and 14 cooperate with electrical means, including at least one thyratron 13 with its grid bias battery, and a relay 16 energized by the current flowing through the anodic circuit of said thyratron and operating a contact 18 which controls the tools, this contact 18 being inserted between the ground and battery 6 and acting to control the working of motor 11. The self-induction of relay 16 is adapted to the capacity of a condenser 17 so as to form an oscillatory circuit, inserted in the anodic circuit of thyratron 13, which transforms the direct current supplied by a generator 22 into a current oscillating between zero and a constant maximum. Thus, despite the fact that thyratron 13 is fed from generator 22, it is possible to have the discharge stopped on the first zero after disappearance of the control grid bias. The frequency of circuit 16—17 should be high enough for making negligible the time interval between two successive zeros of the discharge pulsatory current.

19 is the grid bias adjusting resistance, 20 a potential drop resistance, 21 a grid protection resistance, and 23 is a thyratron filament heating transformer.

With such an arrangement, when one of the brushes 5 is brought into contact with a plant A, the grid is given a positive bias through the resistances of said plant and of the ground. Contact 18 is closed and energizes relay 7 to bring motor 11 into play for withdrawing the tool from the path passing through plant A.

On the contrary, when one of the brushes 14 touches a plant before the corresponding brush 5, the last mentioned brush has no action on relay 18 which remains open and the plant is destroyed by the tool 4 of the machine.

In the embodiment of Fig. 2, contact elements 5 and 14 are constituted by horizontal conductors extending transversely to the direction of movement of the machine so as to scan the spaces between successive plants A (which are not necessarily disposed in longitudinal rows). Of course, tools 4 (which are not shown on Fig. 2) are then preferably adapted to have a zone of action of a width, that is to say of a dimension in the transverse direction, corresponding to the transverse lengths of conductors 5 and 14, so that whenever conductor 14 comes into contact with a parasitical plant, said plant is subsequently destroyed by a tool.

In the modification of Fig. 3, contact elements 5 are given a shape, in cross section, corresponding to the envelope of the contours of a plant A at various times of its growth, so that the working of a machine made for instance according to the embodiment of Fig. 1 remains satisfactory whatever be the degree of growth of the plants.

In the embodiments above described, it has been assumed that the electric circuits which control the operation of the tool are closed through the plant and the earth, but of course this is not a necessary condition, as this closing of the circuit could take place through the plant alone, by making use of two contact elements respectively connected to the terminals of the source of current.

It is also pointed out that the machine could as well be designed in such manner that when a plant is touched by the contact element, it is destroyed, instead of being respected, as supposed in the preceding description, the plants that are not touched by the contact elements being then respected.

Switch means may be provided for causing a machine to work either according to this last mentioned way of operating or according to that initially described, in which the plants touched by the contact elements are respected by the tools.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An agricultural machine which comprises, in combination, a frame adapted to be moved along the surface to be cultivated, at least one tool carried by said frame, electrical means for controlling said tool, an electric circuit for energizing said means, and at least one electric contact element carried by said frame ahead of said tool adapted to cooperate with a plant present on its path of travel for inserting said plant in said circuit so as to close it through the plant.

2. An agricultural machine which comprises, in combination, a tractor, a frame coupled to said tractor so as to be driven by it, two tools carried by said frame on either side of the longitudinal middle plane thereof, motor means for displacing said frame transversely with respect to said tractor in one direction or the other, two distinct electrical means for operating said motor means in opposed directions respectively, an electric circuit for energizing each of said electrical means, and a contact element carried by said frame ahead of each of said tools adapted to cooperate with a plant present on its path of travel for inserting said plant in one of said circuits, respectively so as to close it through the plant.

3. An agricultural machine which comprises, in combination, a frame adapted to be moved along the surface to be cultivated, at least one tool carried by said frame, electrical means for controlling said tool, an electric circuit for energizing said means, at least one electric contact element carried by said frame ahead of said tool adapted to cooperate with a plant present on its path of travel for inserting said plant in said circuit so as to close it, at least one other electric contact element adapted to cooperate with a plant present on its path of travel, said second mentioned contact element being carried by said frame above said first mentioned contact element, and means, operative by said second mentioned contact element in response to the meeting thereof with a plant, for neutralizing the effect of the meeting of said first mentioned contact element with said plant.

4. An agricultural machine which comprises, in combination, a frame adapted to be moved along the surface to be cultivated, at least one tool carried by said frame, electrical means for controlling said tool, an electric circuit for energizing said means, at least one electric contact element carried by said frame ahead of said tool adapted to cooperate with a plant present on its path of travel for inserting said plant in said circuit so as to close it through the plant, at least one other electric contact element adapted to establish electric contact with a plant present on its path of travel, said second mentioned contact element being carried by said frame slightly ahead of said first mentioned contact element and above it, and electrical means, including a circuit adapted to be closed by said second mentioned contact element through a plant in contact with said element, for neutralizing the effect of the meeting of said first mentioned contact element with said plant.

5. A machine according to claim 1 in which said contact element includes a metallic support, and a wick impregnated with an electricity conducting liquid carried by said support so as to be able freely to contact plants lying in the path of travel of said contact element.

FRANÇOIS BONCOMPAIN.

REFERENCES CITED

The following references are of record in the file of this patent:

UNITED STATES PATENTS

| Number | Name | Date |
|---|---|---|
| 546,682 | Scheible | Sept. 24, 1895 |
| 1,570,415 | Sumbulian | Jan. 19, 1926 |
| 1,661,030 | Burt | Feb. 28, 1928 |